(12) United States Patent
Malakhov

(10) Patent No.: US 9,563,477 B2
(45) Date of Patent: Feb. 7, 2017

(54) PERFORMING CONCURRENT REHASHING OF A HASH TABLE FOR MULTITHREADED APPLICATIONS

(75) Inventor: Anton Malakhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 13/260,438

(22) PCT Filed: Apr. 8, 2009

(86) PCT No.: PCT/RU2009/000169
§ 371 (c)(1),
(2), (4) Date: Sep. 26, 2011

(87) PCT Pub. No.: WO2010/117294
PCT Pub. Date: Oct. 14, 2010

(65) Prior Publication Data
US 2012/0036134 A1   Feb. 9, 2012

(51) Int. Cl.
*G06F 7/00*   (2006.01)
*G06F 9/50*   (2006.01)
(52) U.S. Cl.
CPC ................................ *G06F 9/5016* (2013.01)
(58) Field of Classification Search
CPC combination set(s) only.
See application file for complete search history.

(56) References Cited

U.S. PATENT DOCUMENTS

| 6,115,802 | A | 9/2000 | Tock et al. |
| 6,292,795 | B1 * | 9/2001 | Peters et al. |
| 6,578,131 | B1 * | 6/2003 | Larson et al. ................ 711/216 |
| 7,287,131 | B1 | 10/2007 | Martin |
| 7,464,103 | B2 * | 12/2008 | Siu et al. |
| 7,702,628 | B1 * | 4/2010 | Luchangco et al. ... 707/999.006 |
| 7,809,916 | B1 * | 10/2010 | Shavit et al. ................ 711/170 |
| 8,392,368 | B1 * | 3/2013 | Kelly et al. ................. 707/634 |
| 2002/0150326 | A1 * | 10/2002 | Hakimi et al. ................ 385/16 |
| 2002/0152306 | A1 * | 10/2002 | Tuck, III ....................... 709/224 |
| 2004/0083347 | A1 * | 4/2004 | Parson ......................... 711/165 |

(Continued)

FOREIGN PATENT DOCUMENTS

JP      6-231172      8/1994

OTHER PUBLICATIONS

Maurice Herlihy et al., "The Art of Multiprocessor Programming," Morgan Kaufmann Publishers is an imprint of Elsevier, 2008, part 13, paragraph 13.4.

(Continued)

*Primary Examiner* — Hosain Alam
*Assistant Examiner* — Thu Nga Nguyen
(74) *Attorney, Agent, or Firm* — Trop, Pruner & Hu, P.C.

(57) ABSTRACT

In one embodiment, the present invention includes a method for allocating a second number of buckets for a hash table shared concurrently by a plurality of threads, where the second number of buckets are logically mapped onto a corresponding parent one of the first number of buckets, and publishing an updated capacity of the hash table to complete the allocation, without performing any rehashing, such that the rehashing can later be performed in an on-demand, per bucket basis. Other embodiments are described and claimed.

17 Claims, 6 Drawing Sheets

(56) References Cited

U.S. PATENT DOCUMENTS

2004/0215639 A1* 10/2004 Bamford et al. ............. 707/100
2006/0075489 A1    4/2006 Ganguly
2008/0021908 A1*  1/2008 Trask et al. .................. 707/100

OTHER PUBLICATIONS

International Search Report issued in corresponding PCT Application No. PCT/RU2009/000169, dated Dec. 10, 2009, 7 pgs.
"Split-Ordered Lists: Lock-Free Extensible Hash Tables," Ori Shaev, et al., Journal of the ACM, vol. 53, No. 3, May 2006, pp. 379-405.
State Intellectual Property Office, P.R. China, First Office Action and Search Report, issued Aug. 21, 2013, in related CN application No. 200980159762.3, and 14 pages of translation.
China Patent Office, Fourth Office Action mailed Sep. 14, 2015 in Chinese Patent Application No. 200980159762.3.

* cited by examiner

PERFORMING CONCURRENT REHASHING OF A HASH TABLE FOR MULTITHREADED APPLICATIONS

BACKGROUND

Hash tables are a fundamental building block in diverse applications such as databases, search engines, statistics processing, and dynamic script languages. Hash tables are a family of containers that associate keys with values. Hash tables calculate placement position for an item stored in an entry of the table, i.e., a bucket, using its hash value and a current capacity of the container. However containers usually need to dynamically increase capacity, which means either reallocation or allocation of an additional chunk of memory. So, increased capacity leads to invalidation of item placement and requires items to be moved to new places, which is commonly referred to as rehashing.

For known concurrent algorithms for hash tables, when a thread decides to resize a container, it blocks (i.e., temporarily stops) some (or even all) concurrent operations on the table until it finishes both resizing and rehashing processes. This leads to degradation in concurrency, and thus in performance. Another problem is that running time and complexity of operations with resizing differ significantly from the same operations without resizing.

DETAILED DESCRIPTION

Embodiments may be used to perform concurrent resizing and on-demand per-bucket rehashing for a concurrent hash table that is a shared memory accessed by one or more threads that may execute on one or more cores of a multiprocessor system, such as a system having one or more multicore processors. It is applicable for hash tables where a bucket can store a set of items. For simplicity, assume that the initial capacity of a table is a power of two. The residue of division of a hash value for an item by the capacity gives the index of a bucket that stores the item. In some embodiments via a simplification, a bucket index also can be calculated by the following formula:

$$\text{bucket\_idx} = \text{hash} \& (\text{capacity} - 1) \qquad \text{Eq. [1]}$$

where hash is a hash value that is obtained by a hash computation in which a key is applied to a hash function that generates the hash value and "&" denotes bitwise AND of binary representations. In one embodiment, the capacity may be in units of numbers of buckets of the hash table, although the scope of the present invention is not limited in this regard.

To increase capacity, an algorithm in accordance with an embodiment of the present invention may allocate as many buckets as already exist and keep the old buckets, thus doubling the number of buckets. Each new bucket is logically mapped onto an existing bucket (parent) which has an index including the same value (i.e., bit set) as in the index of the new bucket except the highest bit holding value 1. For example, if index of a bucket is 00<u>1</u>01101 in binary notation, then respective index of parent bucket is 00<u>0</u>01101. Namely, the parent bucket index can be obtained as follows:

$$\text{parent\_idx} = \text{bucket\_idx} \& (1 << \lfloor \text{Log 2}(\text{bucket\_idx}) \rfloor) - 1) \qquad \text{Eq. [2]}$$

where << denotes shifting a binary left operand by the number of bits specified by the right operand.

In many implementations, certain new buckets can have other new buckets as parents. The allocations that lead to it can be combined into a single memory request in some implementations, as described below.

Figure 1:
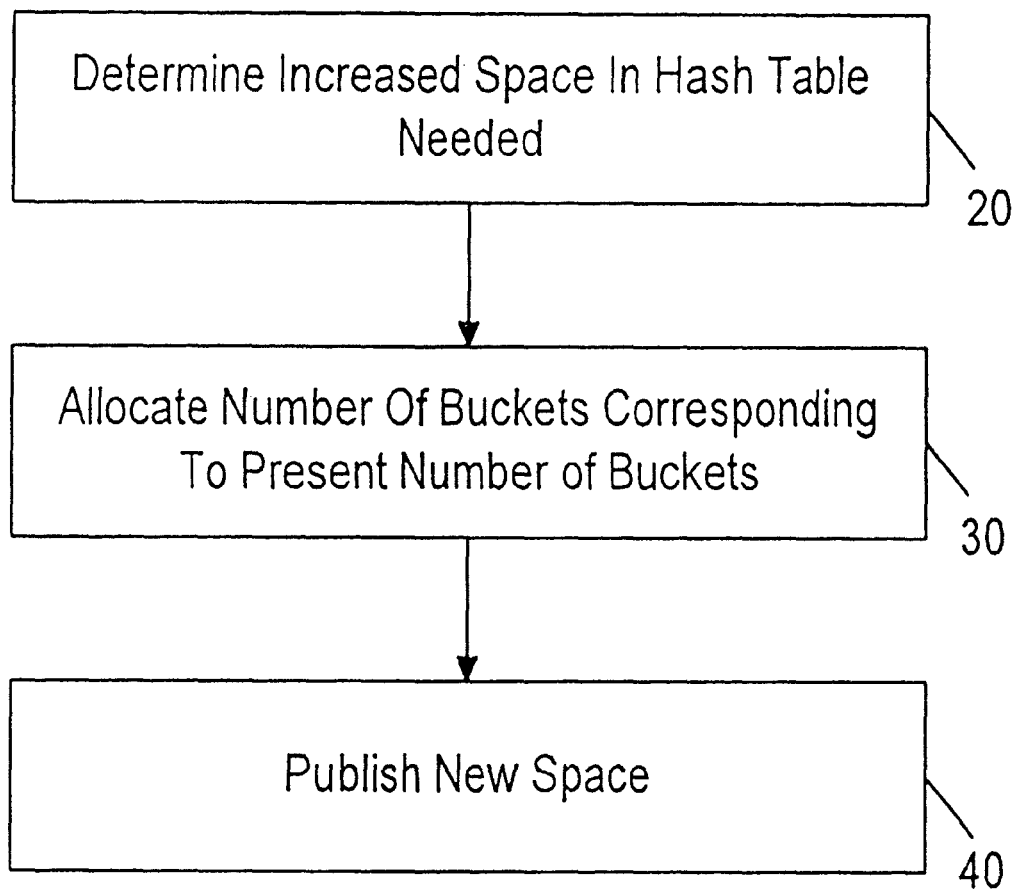
FIG. 1 is a flow diagram of a method for updating a hash table in accordance with one embodiment of the present invention.

Referring now to FIG. 1, shown is a flow diagram of a method for updating a hash table in accordance with one embodiment of the present invention. As shown in FIG. 1, method 10 may begin by determining that increased space in a hash table is needed (block 20). While the scope of the present invention is not limited in this regard, such a determination may be made based on a load factor of the table, e.g., by system software upon an insert operation for a new data pair when an amount of data stored in a hash table reaches a predetermined threshold, e.g., a certain percentage of the total table amount. Of course, other manners of determining that increased space is needed may be used in other embodiments. For example, a user may specify a number of buckets in a call to a reserve operation.

Upon such determination, control passes to block 30, where a number of new buckets may be allocated. More specifically, a number of buckets may be allocated corresponding to the present number of buckets in the hash table. In this way, the number of buckets allocated to the table is doubled. In one embodiment an allocator is called to get the required amount of memory and initialize buckets as new empty buckets. Then, this new space may be published (block 40). While the scope of the present invention is not limited in this regard, publication may be via an update to a variable containing a capacity value. In one embodiment, this update may be via a store with release operation (or an atomic write) to a "capacity" variable. Alternately, such update may be to a mask that corresponds to the value of the capacity minus 1. Thus by allocating new buckets and publishing this new space, allocation is completed without the need for performing a full rehashing of the data present in the original buckets into the new buckets. That is, allocation is done independently from rehashing and is finished by publication of the new space. Each bucket in the newly published space is initially marked as non-rehashed.

Figure 2A:
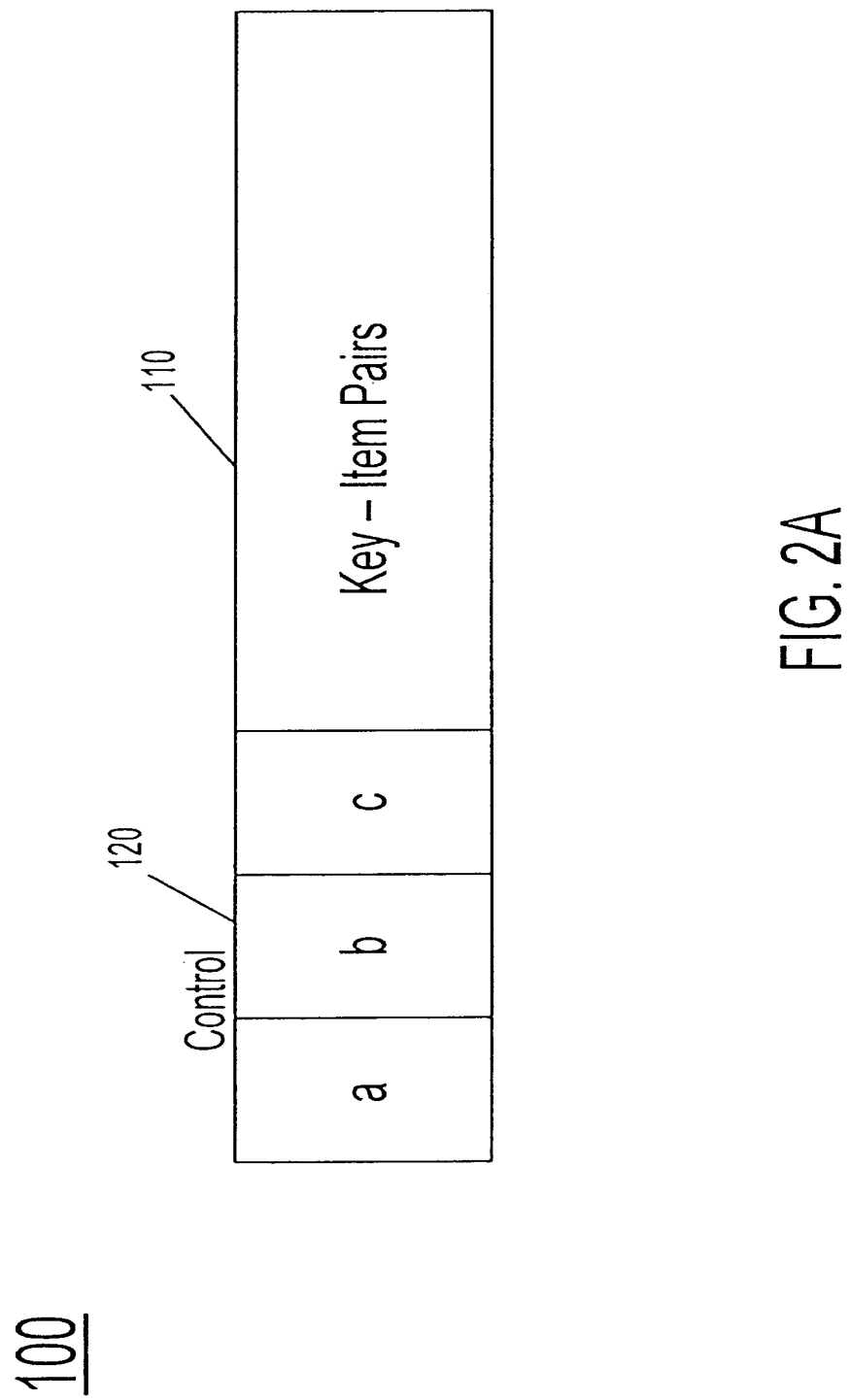
FIG. 2A is a block diagram of a bucket in accordance with one embodiment of the present invention.

Referring now to FIG. 2A, shown is a block diagram of a bucket in accordance with one embodiment of the present invention. As shown in FIG. 2A, bucket 100 may include data, namely a data portion 110 that includes key and item pairs, referred to herein generally as data pairs. Data portion 110 can optionally contain a limited set (array) of pairs directly (embedded) and indirectly, e.g., through a pointer. In addition, control information 120 is present. Various information can be included in control information 120 including, for example, a synchronization object (a) such as a mutex, a control field (b) which may include various information such as flags, counters and so forth, and a rehash state field (c), which may include various information indicating whether the given bucket has been rehashed, and a number of rehashed levels (which can be used for a one-to-many approach, described below).

Figure 2B:
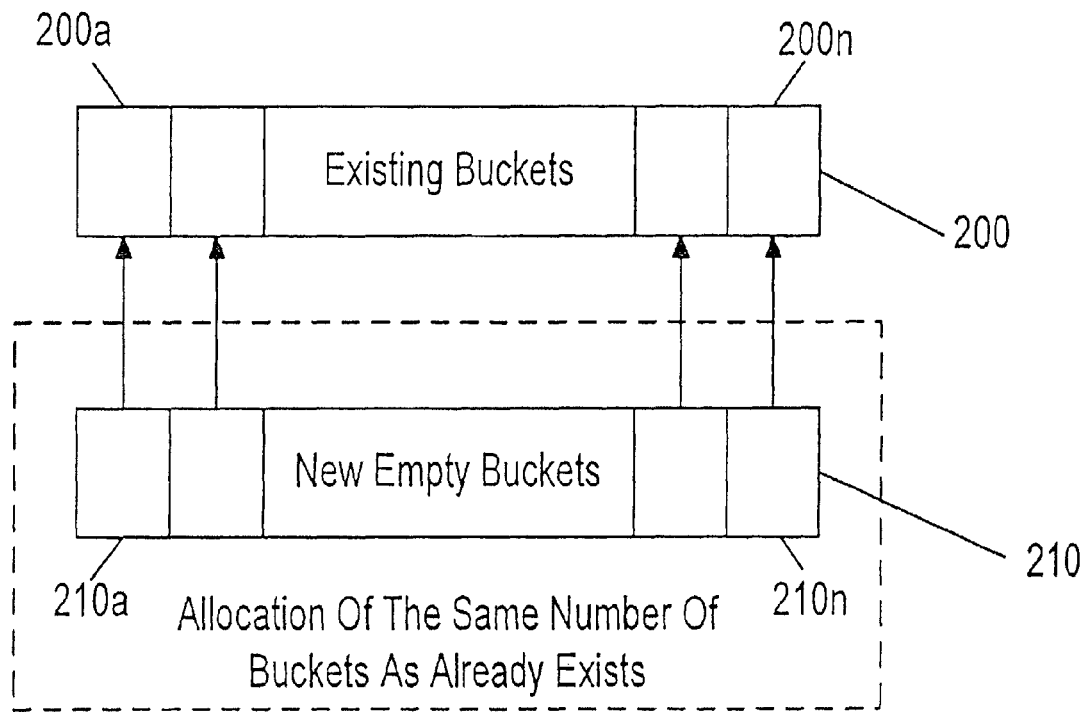
FIG. 2B is a block diagram illustrating allocation of new buckets in accordance with one embodiment of the present invention.

Referring now to FIG. 2B, shown is a block diagram illustrating allocation of new buckets in accordance with an embodiment of the present invention. As shown in FIG. 2B, a plurality of existing buckets $200_a$-$200_n$ are present. Each such bucket may be in accordance with bucket 100 of FIG. 2A, as an example. On a reallocation operation, new buckets are logically mapped onto the parent buckets, creating a new set of empty buckets $210_a$-$210_n$. As seen, the allocation is for the same number of buckets that already exists. Each of these new buckets is logically mapped onto one of the parent buckets and is marked as non-rehashed, e.g., in its control information 120, such as rehash field (c) shown in FIG. 2A.

Figure 2C:
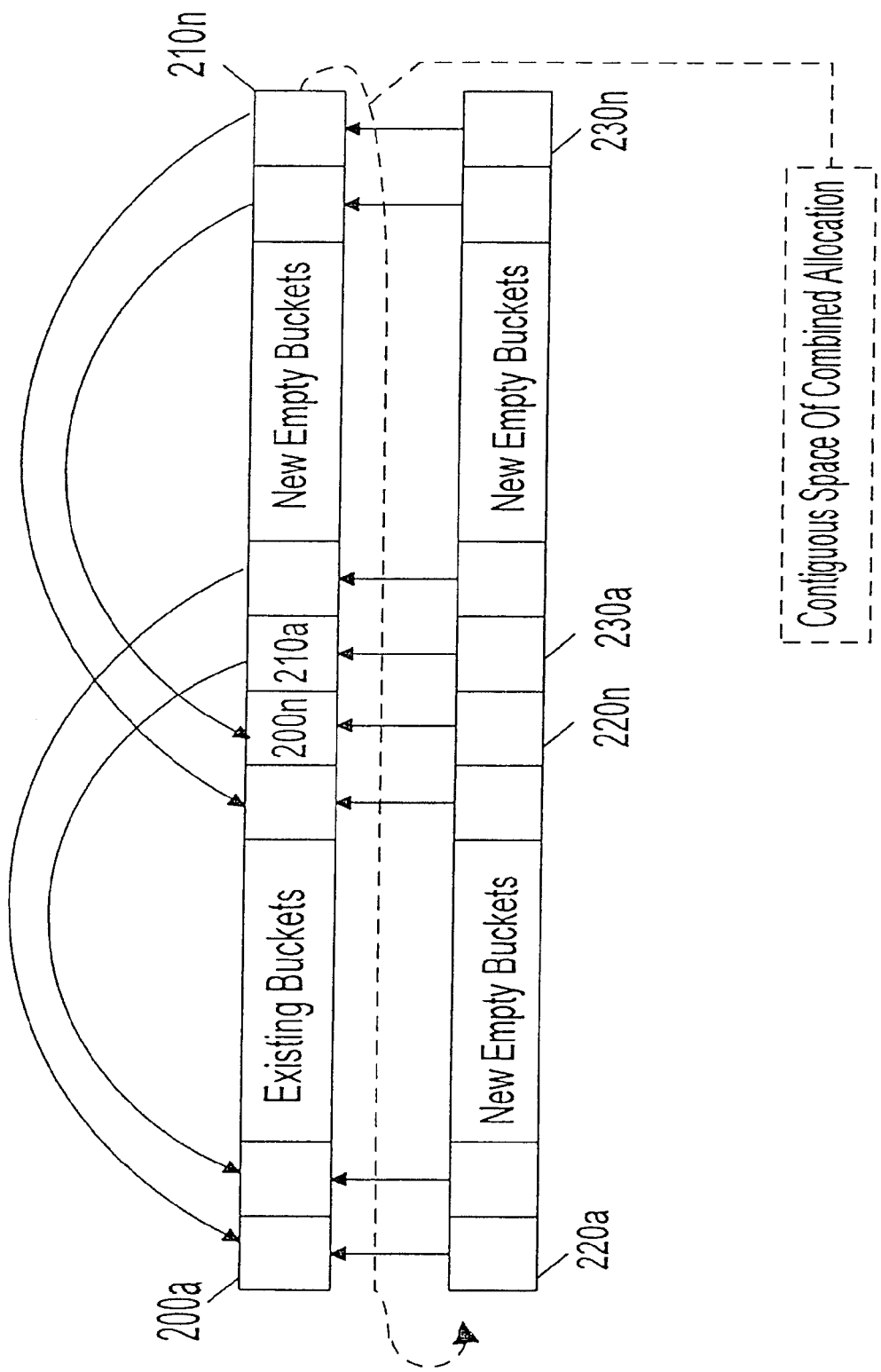
FIG. 2C is a block diagram illustrating allocation of new buckets in accordance with another embodiment of the present invention.

In other cases, at least some of the new buckets can be mapped onto other new buckets as illustrated in FIG. 2C. Thus FIG. 2C is a subset of FIG. 2B, and it describes two separate possibilities: (1) parent buckets can be also non-rehashed; and (2) allocations can be combined. As seen, new empty buckets $210_a$-$210_n$, map onto existing buckets $200_a$-$200_n$. In turn, additional new empty buckets $220_a$-$220_n$ also map onto existing buckets $200_a$-$200_n$. In addition, other new empty buckets $230_a$-$230_n$ map onto new empty buckets $210_a$-$210_n$. Note that the new empty buckets beginning at bucket $210_a$ and finishing at $230_n$ may be a contiguous space of a combined allocation and the number of buckets can be doubled a few times at once, e.g., the number of buckets may be multiplied by a factor of 4.

After allocation and publication of the new capacity value, any lookup operation computes a bucket index using the new capacity value. After publication of the new capacity, any operation looking into a new bucket should first look into the parent bucket(s) and optionally (but eventually) rehash its (their) content into the new bucket(s). Thus rehashing work can be deferred and split across subsequent operations within the container. A calculated index using a new capacity value can point to a bucket marked as non-rehashed. If so, the lookup operation may proceed to first look into the parent bucket, grandparent bucket, etc., until a rehashed bucket or a required key is found. When the desired information is found, the lookup results may be returned to the requestor. Still further, a per-bucket rehash (of processed buckets) may occur. Such rehashing may be referred to as a lazy rehash, in that rather than taking the time and cost to perform a complete rehash of a whole table on reallocation, individual bucket rehashing (on-demand) may occur responsive to a lookup request. Alternately, such rehashes may occur by external (user) request.

Thus optionally (but eventually), all items that were on the way may be rehashed by moving the data pairs into the new bucket(s) if they belong there. For that, different strategies are possible. As an example, two states can be used to identify buckets, rehashed and non-rehashed. In this implementation, a dedicated owner is provided for the rehashing operation. For this, a thread locks a bucket using a mutual exclusive synchronization so no other thread can access it during the time of operation and thus should wait.

A third state may be added, namely a "partially rehashed" state so that other threads can concurrently access a new bucket being rehashed or participate in rehashing of the same parent bucket. The main purpose of a three-state implementation is to unblock threads which otherwise must wait until a bucket is rehashed by another thread.

For two-state logic, recursive rehashing between two buckets (e.g., parent and next successor) can be performed, or a one-to-many approach where a parent is rehashed into all non-rehashed successors. For a two-state recursive rehashing algorithm, one state variable (e.g., present in control information 120 of FIG. 2A) may be present with states NEW (empty non-rehashed), EMPTY (but rehashed), and FILLED (rehashed). For example, a pointer to data pairs can represent all three states and still refer to the data. Note a one-to-many implementation uses an additional member of a bucket data structure that express a number of rehashed levels (capacity) for a bucket.

Figure 3:
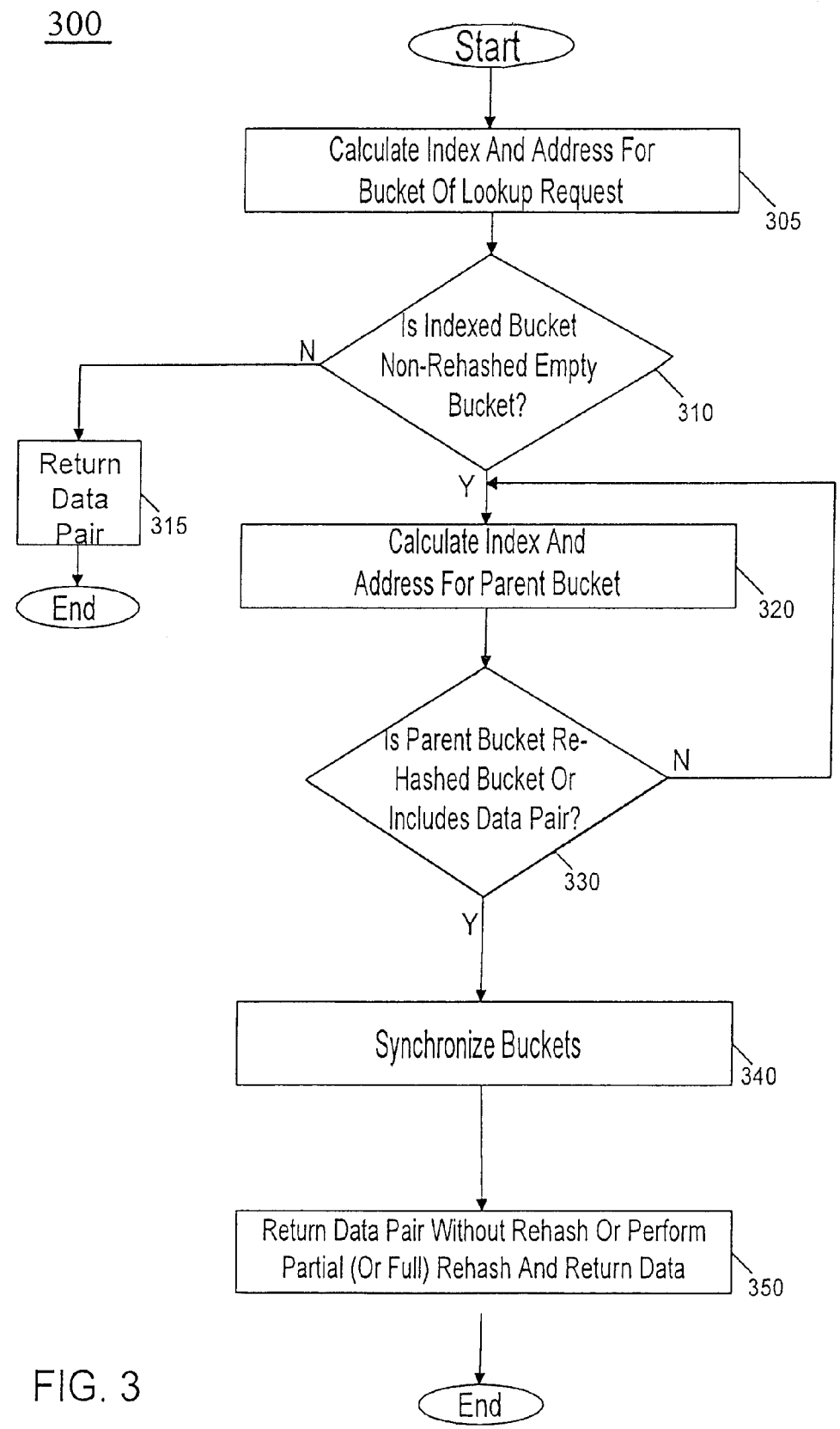
FIG. 3 is a flow diagram of a method for performing lookups/rehashings in accordance with an embodiment of the present invention.

Referring now to FIG. 3, shown is a flow diagram of a method for performing lookups/rehashings in accordance with an embodiment of the present invention. This flow diagram is intended to show a high level view that corresponds to both a one-to-one (recursive) and a one-to-many approach, either of which can be implemented, and both of which are described further below. The lookup request may be for a find-only or insert operations. For ease of discussion a find operation will be described. As shown in FIG. 3, method 300 may begin by calculating a bucket index and address for a lookup request (block 305). For example, a key associated with a requested data pair may be provided to a hash function, which generates a hash value, which along with the hash table capacity, can be used to obtain an index and so an address in memory. Next it may be determined whether the lookup request is to a non-rehashed empty bucket (diamond 310). If not, the lookup may be performed by accessing the indexed bucket and providing the data pair(s) to the requestor (block 315). Note that additional operations like synchronization, searching through the bucket, checking for a race condition, and optionally restarting the entire lookup operation (if a race is detected) may be performed during this step, as will be described further below.

If instead it is determined that the lookup request is to a non-rehashed bucket, control passes to block 320. At block 320 an index and address may be calculated for the parent bucket. As discussed above, such index may be calculated in accordance with Equation 2, in some implementations. When the index is calculated, it may be used to access the parent bucket. This accessed bucket may be checked to determine whether it is rehashed or includes the requested data pair (diamond 330). This determination may be based in part on a rehash state of the bucket. If a rehashed bucket is found, buckets may be synchronized (block 340), and the data pair may be returned to the requestor (block 350). Otherwise, control passes back to block 320, for a further iteration of this loop. Synchronization at block 340 may include locking of buckets of interest prior to performing any search or rehash operation. Note that that at block 350 the decision of whether to rehash may depend on a given algorithm, which may provide for rehashing on-demand, partial rehashing, or rehashing by a dedicated thread. If rehashing is performed, the rehash state of one or more buckets may be updated when the rehashing is performed. For a one-to-many approach, the states of parent and all of new buckets are changed. Note that at this point after rehashing, the parent bucket may be stripped of some pairs in order to move them into successors (and state changed for one-to-many approach).

Because buckets are never deallocated or moved concurrently, some non-blocking or lock-free algorithms may be used to access buckets and embedded data. In this way, performance and scalability of applications using hash tables can be increased.

With multiple threads accessing a hash table as a shared resource, it is possible that a rehashing-lookup race condition could occur. If a key is not found it is also possible that it was moved concurrently while rehashing a bucket. To make sure a key does not exist, a current capacity can be compared to the initial capacity which was used to compute the bucket index. If they are not equal, it may next be determined whether the bucket indexes computed with these values are different (both comparisons may be reduced to the last one). If so, and if the closest successor bucket was or is being rehashed, the lookup should be restarted (in order to make sure a key doesn't exist). Note that there can be not the only successor if the capacity has been multiplied by more than 2. As one example of a race condition, consider the following sequence that is possible in a concurrent environment:

TABLE 1

1. Thread 1: gets current capacity and calculates bucket index (X) for lookup operation.
2. Thread 2: finishes allocation of new buckets and publishes the new capacity.
3. Thread 3: gets new capacity value and starts rehashing of the bucket (X) into the new space (Y).
4. Thread 1: continues by searching the bucket (X) for an item and can't find it. But this does not mean that an item doesn't exist in the entire table because it can be moved (to Y) due to concurrent growth (2) and rehashing (3).

Referring now to Table 2, shown is a pseudo-code example for determining existence of a race condition in accordance with an embodiment of the present invention, namely an example algorithm for checking whether a rehash collision may occur.

TABLE 2

```
bool check_rehashing_collision ( hash, capacity_old, capacity_new ) {
    if ( (hash & (capacity_old−1) ) != (hash & (capacity_new−1) ) ) {
        // find next applicable mask after old level
        while( (hash & capacity_old)==0 )
            capacity_old = (capacity_old<<1);
        capacity_old = (capacity_old<<1);
        // check whether it is rehashing or rehashed
        if ( ! is_marked_for_rehashing (hash & (capacity_old−1) ) )
            return true; // a lookup must be restarted
    }
    return false; // there is no collision
}
```

In one embodiment, a two-state recursive rehashing algorithm with three functions can be used, namely a lookup function, a get bucket function, which performs a synchronization and a call to the third function, namely a rehashing function. Referring now to Table 3, shown is a pseudo-code for such a two-state recursive rehashing algorithm.

TABLE 3

Lookup:
   1. calculate hash value for a given key
   2. get current capacity value and calculate bucket index (using hash and capacity)
   3. call: Get bucket for read
   4. search through the bucket for a key
      a. if found: release the bucket and return the data be performed
   5. not found: check for rehashing race (e.g., in accordance with Table 2)
      a. if no race happened: [insertion operation can be performed or] release the bucket and return
      b. race detected: release the bucket and go to (2)
Get bucket (implementation for read-write locks):
   1. calculate/get bucket address
   2. get state of the bucket
      a. if NEW (not rehashed): try to acquire exclusive access to the bucket (some thread must succeed)
         if failed: go to (3)
      b. acquired: if bucket state is still NEW (double-check), call: Rehash bucket and return
   3. acquire specified access to the bucket
Get bucket (implementation for mutual exclusive locks only):
   1. calculate bucket address using hash and capacity values
   2. acquire (exclusive) access to the bucket
   3. get state of the bucket
      a. if NEW (not rehashed): call: Rehash bucket
Rehash bucket: (which is performed under an exclusive lock due to "Get bucket" algorithm)
   1. mark the new bucket as rehashed
   2. calculate index of parent bucket
   3. call: Get parent bucket for read
   4. for each data item in the parent bucket:
      a. calculate hash value
      b. check if item should be moved to the new bucket, if yes:
         i. if necessary, upgrade the parent bucket to exclusive access
         (if lock was interrupted for upgrading, restart from (4))
         ii. move item from the parent bucket to the new bucket
   Note that the cross-reference between the Rehash bucket and Get bucket functions means this algorithm is recursive. Note also that a concurrent rehashing algorithm in accordance with an embodiment of the present invention does not require particular locking algorithms, as instead it just states a synchronization level. For example, "get bucket for read" can mean any actual use of: acquiring exclusive lock, shared (reader) lock, or even using a version counter only (for non-blocking read operations).
In yet another embodiment, a one-to-many approach can be used. Table 4 is a pseudo-code representation for a one-to-many algorithm.

TABLE 4

Lookup:
1. calculate hash value for a given key
2. get current capacity value and calculate bucket index (using hash and capacity) and address
3. get state of the bucket, if it's not rehashed (new):
    a. find the closest rehashed root (parent/grandparent, etc.) bucket
    b. try to acquire exclusive access to the root bucket until acquired or state of new bucket is changed to "rehashed"
        if the state is changed: release the lock if necessary and go to (4)
    c. call: Rehash bucket
4. acquire specified access to the bucket
5. search through the bucket for a key
    d. if found: release the bucket and return the data be performed
6. not found: check for rehashing race (e.g., in accordance with Table 2)
    e. if no race happened: [insertion operation can be performed or] release the bucket and return
    f. race detected: release the bucket and go to (2)

Rehash bucket: (which is performed under an exclusive lock)
1. for root bucket and each of all its successor buckets:
    a. store capacity value to rehash level field (and so mark the bucket as rehashed)
2. for each data item in the root bucket:
    b. calculate hash value
    c. check if item should be moved to the new bucket, if yes:
        i. move item from the parent bucket to an appropriate new bucket An embodiment may be implemented in code for an associative container in a library. Thus in various embodiments instead of locking an entire container (or a section of the container) for updates, an allocation may allocate as many buckets as already exist, and keep the old buckets, thus doubling the number of buckets. Each new bucket is marked as non-rehashed and is logically mapped onto an existing bucket (parent) with the same index. In some embodiments, the allocations can also be combined into one publication and a single memory request may be used. Thus resizing in accordance with an embodiment of the present invention does not hurt concurrency because it neither invalidates nor locks existing buckets.

Figure 4:
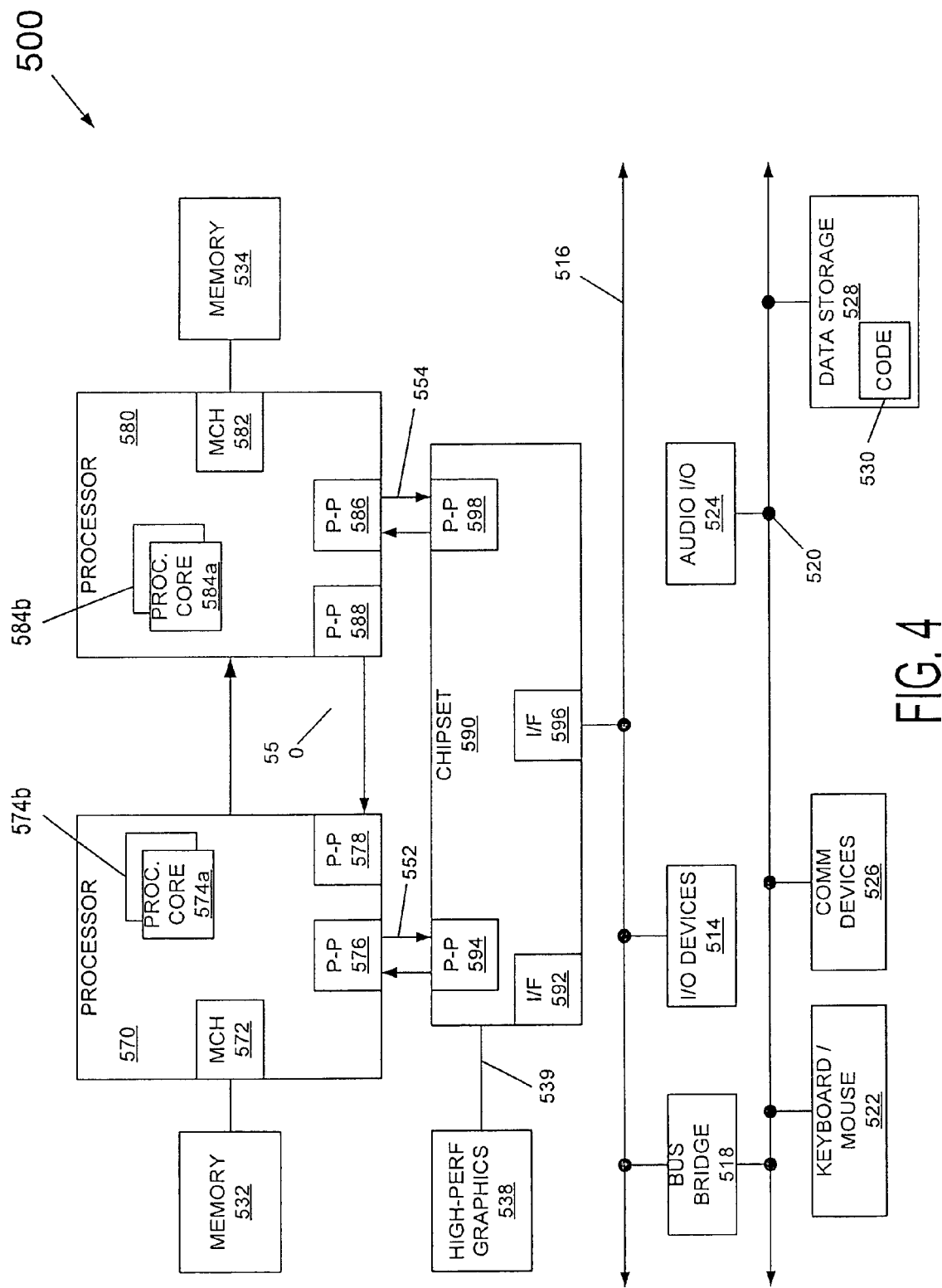
FIG. 4 is a block diagram of a system in accordance with one embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors. The processor cores may execute various threads which may access hash tables stored in system memory in accordance with an embodiment of the present invention described above.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors, and which may store one or more hash tables that can be concurrently rehashed in accordance with an embodiment of the present invention. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 3, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
allocating a second group of buckets including a second plurality of buckets for a hash table shared concurrently by a plurality of threads, the hash table having a first group of buckets including a first plurality of buckets, a count of the second plurality of buckets being at least equal to a count of the first plurality of buckets, wherein each bucket of the second group of buckets is logically mapped onto one of a corresponding bucket of the first group of buckets and a corresponding bucket of the second group of buckets;

publishing an updated capacity of the hash table, wherein the updated capacity includes the first plurality of buckets and the second plurality of buckets, wherein the allocating is completed by publishing the updated capacity and without performing any rehashing of contents of the first group of buckets;

responsive to the lookup operation by a first thread, not finding a requested data pair in a first bucket of the first group of buckets, comparing a current capacity of the hash table to a first capacity of the hash table used to determine a bucket index for the lookup operation, and if the current capacity of the hash table and the first capacity of the hash table are different, calculating an index of a closest successor bucket of the hash table, accessing the closest successor bucket and determining a rehash state for the closest successor bucket of the hash table; and responsive to a lookup operation for a data pair present in the first bucket of the first group of buckets, performing a rehashing of contents of the first bucket to a corresponding bucket of the second group of buckets, without rehashing any other bucket of the hash table.

2. The method of claim 1, further comprising performing a check without locking a second bucket to determine whether rehashing is needed.

3. The method of claim 1, further comprising calculating a bucket index using the updated capacity, accessing the first bucket using the bucket index, determining that the first bucket is not rehashed, and recursively calculating a parent bucket index for the corresponding parent bucket, until a rehashed root bucket is found to which the first bucket is logically mapped using the updated capacity.

4. The method of claim 3, further comprising rehashing at least part of contents of the rehashed root bucket to the first bucket when or prior to searching for a data pair of a lookup request.

5. The method of claim 4, further comprising setting a partial rehash indicator when only part of the contents of the rehashed root bucket is rehashed to the first bucket.

6. The method of claim 3, further comprising searching the first group of buckets and the second group of buckets for a data pair of a lookup request and returning the data pair, and not rehashing contents of the first group of buckets and the second group of buckets.

7. The method of claim 1, further comprising combining a plurality of allocations into a single allocation for the second group of buckets.

8. The method of claim 1, further comprising publishing a plurality of allocations and publishing the updated capacity once for the plurality of allocations.

9. An article comprising a non-transitory machine-readable storage medium including instructions that if executed by a machine enable the machine to
perform a method comprising:
performing, responsive to a user request, a lookup operation to a hash table shared concurrently by a plurality of threads, including calculating a bucket index for a first bucket of the hash table using a first capacity value that is based at least in part on a first count of buckets in the hash table, accessing the first bucket using the bucket index, and determining that the first bucket does not include a data pair of the lookup operation;

comparing a current capacity value that is based at least in part on a current count of buckets in the hash table, to the first capacity value, and if the current capacity value and the first capacity value are different, calculating an updated bucket index using the current capacity value;

if the updated bucket index and the bucket index are different, calculating a next bucket index of the hash table, accessing a next bucket of the hash table corresponding to the updated bucket index, and determining a rehash state for the next bucket; and rehashing a second bucket of the hash table without rehashing any other bucket of the hash table while accessing the second bucket during the lookup operation responsive to the user request.

10. The article of claim 9, wherein the method further comprises restarting the lookup operation if the rehash state is not indicative of a new state.

11. The article of claim 9, wherein the lookup operation is performed by a first thread, the hash table is expanded by a second thread after the first thread obtains the first capacity value, and a third thread begins rehashing the first bucket before the first thread accesses the first bucket, and wherein the hash table is expanded by allocation of a second group of buckets that includes a second plurality of buckets to the hash table that has a first group of buckets that includes a first plurality &buckets, wherein a count of the second plurality of buckets is at least equal to a count of the first plurality of buckets and wherein each bucket of the second group of buckets is logically mapped onto one of a corresponding bucket of the first group of buckets and a corresponding bucket of the second group of buckets.

12. A system comprising:
a microprocessor including a first core and a second core each to execute one or more threads, wherein a first thread is to allocate a second group of buckets that includes a second plurality of buckets for a hash table shared concurrently by a plurality of threads, the hash table previously having a first group of a first plurality of buckets with an associated first count of buckets, a second count of the second plurality of buckets being at least equal to the first count, wherein each bucket of the second group of buckets is logically mapped onto a corresponding parent bucket comprising a corresponding bucket of the first group of buckets or of the second group of buckets, and publish an updated capacity of the hash table including the first and second count of buckets, wherein the first thread is to complete allocation of the second group of buckets by publishing the updated capacity and without performing any rehashing of contents of the first group of buckets of the hash table, and a second thread, responsive to a user request, is to perform a rehashing of contents of a first bucket of the first group of buckets to a second bucket of the second group of buckets without rehashing any other bucket of the hash table during a lookup operation for the user request, wherein the second thread is to calculate a bucket index for the second bucket of the second group of buckets using the updated capacity, access the second bucket using the bucket index, determine that the second bucket is not rehashed, and recursively calculate a corresponding parent bucket index for the corresponding parent bucket to which the second bucket is logically mapped, until a rehashed root bucket is found; and a shared memory coupled to the microprocessor to store the hash table, the hash table to be concurrently accessed by at least some of the plurality of threads.

13. The system of claim 12, wherein the second thread is to rehash at least part of contents of the rehashed root bucket to the second bucket without rehashing any other bucket of the hash table when or prior to searching for a data pair of the lookup operation.

14. The system of claim 13, wherein the second thread is to set a partial rehash indicator of the root bucket when only part of the contents of the rehashed root bucket is rehashed.

15. The method of claim 1, wherein a bucket of the second group of buckets is logically mapped to another bucket of the second group of buckets.

16. The method of claim 1, wherein upon allocation of the second group of buckets, a total number of buckets comprising the first number of buckets and the second number of buckets exceeds twice the first number of buckets.

17. The system of claim 12, wherein a third thread is to perform a lookup operation to the first bucket of the first group of buckets without checking a lock variable to determine whether rehashing is needed.

* * * * *